Sept. 26, 1961 L. R. BURK ET AL 3,001,668
ELECTRIC METER CASE
Filed July 28, 1958

INVENTORS.
LAWRENCE R. BURK
&
BY WILSON A. CHARBONNEAUX

ATT'Y.

United States Patent Office 3,001,668
Patented Sept. 26, 1961

3,001,668
ELECTRIC METER CASE
Lawrence R. Burk and Wilson A. Charbonneaux, Dayton, Ohio, assignors to WacLine, Inc., Dayton, Ohio, a corporation of Ohio
Filed July 28, 1958, Ser. No. 751,290
3 Claims. (Cl. 220—82)

This invention relates in general to electrical indicating meters and, more particularly, to certain new and useful improvements in electrical meter cases.

Ordinarily, electrical indicating meters, such as voltmeters, ammeters, wattmeters, and the like, comprise a case which encloses the instrument mechanism and a glass or similar transparent cover through which the meter movement and position is observed. In electrical meters of this type, it is desirable that the meter case, together with the transparent cover, be constructed and assembled in such a manner as to form a hermetic seal so as to protect the instrument mechanism from moisture or dust. In many types of meter cases, it is difficult to form a satisfactory seal and, even though the meter may be properly sealed, it is sometimes necessary to break the hermetic seal in order that access may be had to the instrument mechanism for purposes of maintenance and repair. Sometimes, the repair man experiences considerable difficulty in breaking the hermetic seal without damaging the housing or cover, and, after the meter has been reassembled subsequent to repair, there are often greater difficulties encountered in resealing the meter case. Moreover, it is often difficult for the repair man to determine whether or not the reassembled meter case is, in fact, properly hermetically sealed since the effectiveness of the seal cannot always be readily determined by visual inspection.

It is, therefore, the primary object of the present invention to provide a meter case which effectively seals out moisture, dust, and the like.

It is also an object of the present invention to provide a meter case of the type stated which can be repeatedly opened and closed without destroying its capability of being quickly and easily resealed.

It is a further object of the present invention to provide a meter case of the type stated which can be quickly and easily disassembled for purposes of maintenance and repair of the instrument.

It is an additional object of the present invention to provide a meter case of the type stated in which the glass window of the instrument is protected from shock which might shatter the glass.

It is still another object of the present invention to provide a meter case of the type stated in which the effectiveness of the seal can be readily determined by visual inspection.

With the above and other objects in view, my invention resides in the novel features of form, construction, arrangement, and combination of parts presently described and pointed out in the claims.

In the accompanying drawing—

Figure 1:
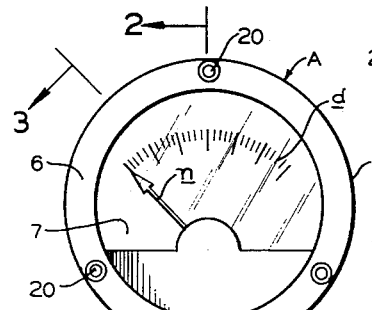
FIG. 1 is a front elevational view of an electrical meter which includes a meter case constructed in accordance with and embodying the present invention.
Figure 2:
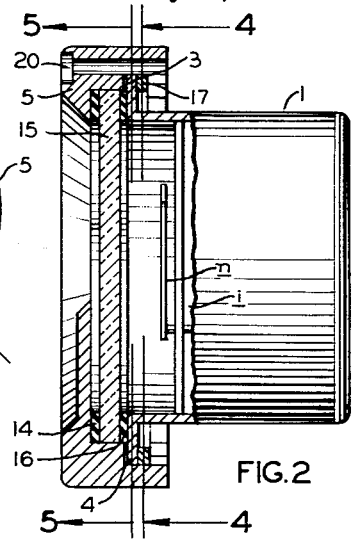
FIG. 2 is a sectional view taken along line 2—2 of FIG. 1.
Figure 6:
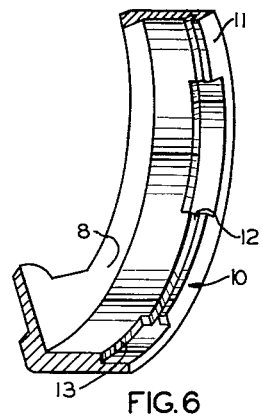
Figure 3:
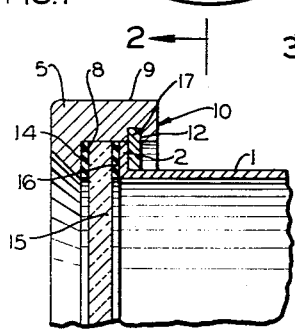
FIG. 3 is a fragmentary sectional view taken along line 3—3 of FIG. 1.
Figure 4:
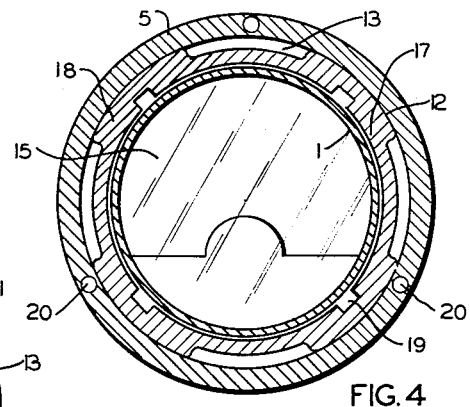
Figure 5:
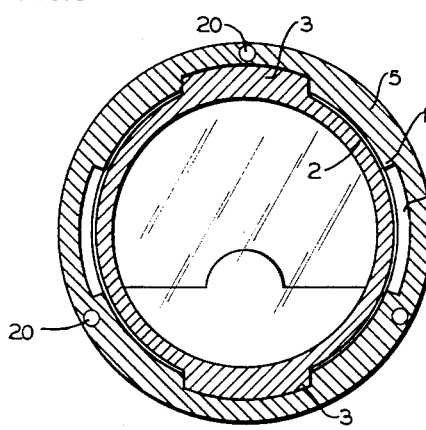
Figure 7:
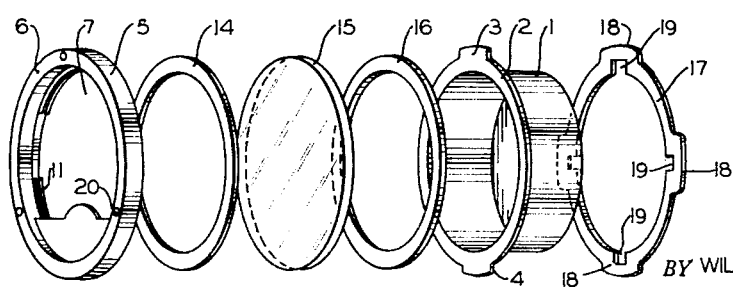

FIGS. 4 and 5 are sectional views taken along lines 4—4 and 5—5, respectively, of FIG. 2;

FIG. 6 is a fragmentary perspective view of the bezel or cover forming part of the present invention; and FIG. 7 is an exploded persepective view of the meter case.

Referring now in more detail and by reference characters to the drawing which illustrates a practical embodiment of the present invention, A designates a meter comprising a hollow cylindrical housing 1 which terminates at its open end in radially outwardly extending marginal flange 2 provided with diametrally opposed indexing tabs 3, 4. Mounted within the housing 1 is a suitable instrument mechanism $i$ which includes a graduated dial $d$ and a movable needle $n$. In connection with the present invention, it should be noted that the instrument $i$ may be any type of mechanism, and, since the details of this mechanism are well known, they are not shown or described in detail.

Provided for cooperation with the housing 1 is a generally cylindrical bezel or cover 5 having a front wall 6 having a large aperture 7 through which the needle $n$ and dial $d$ may be observed. The front wall 6 is, furthermore, provided with an annular inner face 8, and integrally formed with the front wall 6 is a cylindrical flange 9, the latter terminating in a splined portion 10 which includes a plurality of annularly spaced radially inwardly projecting teeth 11. As best seen by reference to FIG. 6, the teeth 11 are machined or otherwise formed with aligned grooves 12, and axially inwardly of the grooves 12, the splined portion 10 terminates in spaced shoulders 13 which are contiguous with the teeth 11. In the embodiment of the invention illustrated, four teeth 11 are shown, but it should be understood that a larger or smaller number of teeth may be used, depending upon the size of the meter A. For example, in a relatively small diameter meter, two teeth may be sufficient while on a meter of six-inch diameter, it may be necessary to use approximately twenty-four teeth. Positioned facewise against the inner face 8 is a distensible annular rubber-like gasket 14, and positioned facewise against the gasket 14 is a window 15, preferably of glass, clear plastic, or other suitable transparent or opaque material. The inner face of the window 15 abuts a resilient gasket 16 which is similar to the gasket 14 previously described, and pressed against the gasket 16 is the peripheral flange 2 of the housing 1. Disposed around the housing 1, and bearing against the flange 2, is an annular locking ring 17 provided on its outer periphery with a plurality of annularly spaced ears 18 which match the teeth 11 and also fit snugly within the grooves 12. The ears 18 are also each provided with an inwardly presented notch 19 for receiving a suitable twisting tool, and for purposes presently more fully appearing.

In assembling the meter A, the instrument $i$ is mounted within the housing 1 in the usual manner, and the cover 5 is placed on a suitable supporting table with the front wall 6 in contact therewith. The cover 5 may be restrained from rotation by means of a collet or pins which project through mounting holes 20 therein. Thereafter, the gasket 14 is placed against the inner face 8, whereupon the glass 15 is placed over the gasket 14 and the gasket 16 is placed upon the glass 15. The housing 1 is then placed within the cover so that the indexing tabs 3, 4 pass between the teeth, allowing the flange 2 to bear against the gasket 16. The indexing tabs 3, 4, will serve to prevent rotation of the housing 1 and also to locate same with respect to the cover 5. Thereafter, the locking ring 17 is positioned over the outside of the housing 1, whereupon, axial pressure is applied to the housing 1, causing the gaskets 14 and 16 to be compressed to a fraction of their normal thicknesses. The locking ring 17 is then shifted axially along the housing 1 into the space between the teeth 11 and in alignment with the grooves 12. With a suitable twisting tool (not shown)

positioned in the notches 19, the locking ring 17 is rotated, allowing the ears 18 to slide in the grooves 12. When the pressure is removed from the housing 1, the cover 5 and housing 1 will be firmly locked together and the gaskets 14, 16, will not only provide a hermetic seal, but will also resiliently support the glass 15 and thereby reduce the possibility of breakage of the glass 15 should any shock be applied to either the housing 1 or the cover 5. Furthermore, since neither the housing 1 nor cover 5 rotate once pressure is applied to the housing 1, there is not endency for the gaskets 14, 16, to twist or distort out of position and destroy the effectiveness of the hermetic seal and the shock mounting of the glass 15.

It will be readily apparent that the meter A may be readily disassembled should access to the instrument *i* be desired. Thus, by placing the meter A on a supporting table with the front wall 6 face down, pressure can be applied to the housing 1, whereupon, the locking ring 17 can be rotated until the ears 18 are out of the grooves 12. Then the locking ring 17 may be axially withdrawn along the housing 1.

It should be understood that changes and modifications in the form, construction, arrangement, and combination of the several parts of the electrical meter case may be made and substituted for those herein shown and described without departing from the nature and principle of our invention.

Having thus described our invention, what we claim and desire to secure by Letters Patent is—

1. A meter case comprising a substantially hollow housing provided with a forwardly presented opening surrounded by a diametrally enlarged radially extending planar flange, said flange in turn being provided at spaced intervals around its periphery with radially projecting ears which are of substantially the same thickness as the flange and are coplanar therewith, an annular bezel having an external diametral size substantially larger than the diametral distance between the outermost peripheral margins of the ears, said bezel including a cylindrical collar-like portion, the inside diameter of which is slightly larger than the outside diametral size of the annual flange of the housing so as to fit snugly but slidably around the periphery of said flange, said bezel being provided along its forward margin with an inwardly extending annular shoulder framing a relatively large viewing opening formed within the bezel, said shoulder having a rearwardly presented flat planar surface adapted for presentation abuttingly toward the outwardly presented face of the flange on the housing, the collar-like portion of the bezel being further provided adjacent its rearward margin with a planar annular groove of substantially the same axial width as the thickness of the ears, said collar also being provided with spline-like axially extending recesses of slightly greater arcuate width than the ears and located around the collar-like portion in registering position with relation to the ears so that the ears may be slid into the recesses, said recesses being deeper in the axial direction than the axial distance between the groove and the rearwardly presented margin of the collar-like portion so that the ears can be pushed into the recesses past the groove, a transparent circular window-element having an outer diametral size approximately equal to the outside diametral size of the flange on the housing, a pair of resilient sealing rings disposed on opposite sides of the window-element, said sealing rings having an outside diametral size substantially similar to the outside diametral size of the window-element and being of relatively narrow radial width so as to abut respectively against the rearwardly presented face of the shoulder and the forwardly presented face of the flange without obscuring the window opening of the bezel or the forwardly presented opening of the housing, and a planar locking ring having a thickness substantially equal to the thickness of said groove, said locking ring having an internal diametral size slightly greater than the outside diametral size of the housing so as to fit snugly but nevertheless rotatably and slidably upon the housing so that it can be slid forwardly along the housing into abutment against the rear face of the flange thereof, said ring having an external diametral size slightly smaller than the internal diametral size of the collar on the bezel, said ring furthermore being provided with radially outwardly extending ears sized and positioned for slidable disposition within the recesses of the collar so as to be slid inwardly within the recesses into alignment with the groove and then rotated into engagement with the groove for locking the flange, the resilient rings and the window-like element into sealed position with the bezel.

2. A meter case comprising a substantially hollow housing provided with a forwardly presented opening surrounded by a diametrally enlarged radially extending planar flange, said flange in turn being provided at spaced intervals around its periphery with radially projecting ears which are of substantially the same thickness as the flange and are coplanar therewith, an annular bezel having an external diametral size substantially larger than the diametral distance between the outermost peripheral margins of the ears, said bezel including a cylindrical collar-like portion, the inside diameter of which is slightly larger than the outside diametral size of the annular flange of the housing so as to fit snugly but slidably around the periphery of said flange, said bezel being provided along its forward margin with an inwardly extending annular shoulder framing a relatively large viewing opening formed within the bezel, said shoulder having a rearwardly presented flat planar surface adapted for presentation abuttingly toward the outwardly presented face of the flange on the housing, the collar-like portion of the bezel being further provided adjacent its rearward margin with a planar annular groove of substantially the same axial width as the thickness of the ears, said collar also being provided with spline-like axially extending recesses of slightly greater arcuate width than the ears and located around the collar-like portion in registering position with relation to the ears so that the ears may be slid into the recesses, said recesses being deeper in the axial direction than the axial distance between the groove and the rearwardly presented margin of the collarlike portion so that the ears can be pushed into the recesses past the groove, a transparent circular window-element having an outer diametral size approximately equal to the outside diametral size of the flange on the housing, a pair of resilient sealing rings disposed on opposite sides of the window-element, said sealing rings having an outside diametral size substantially similar to the outside diametral size of the window-element and being of relatively narrow radial width so as to abut respectively against the rearwardly presented face of the shoulder and the forwardly presented face of the flange without obscuring the window opening of the bezel or the forwardly presented opening of the housing, and a planar locking ring having a thickness substantially equal to the thickness of said groove, said locking ring having an internal diametral size slightly greater than the outside diametral size of the housing so as to fit snugly but nevertheless rotatably and slidably upon the housing so that it can be slid forwardly along the housing into abutment against the rear face of the flange thereof, said ring having an external diametral size slightly smaller than the internal diametral size of the collar on the bezel, said ring furthermore being provided with radially outwardly extending ears sized and positioned for slidable disposition within the recesses of the collar so as to be slid inwardly within the recesses into alignment with the groove and then rotated into engagement with the groove for locking the flange, the resilient rings and the window-like element into sealed position within the bezel, the combined uncompressed thickness of the two sealing rings, the window-element and the flange being greater than the axial distance between the planar surface and the groove of the bezel so that the housing and bezel are pressed axially together placing the sealing rings under compression when the ears of the locking ring are engaged in the groove.

3. A meter case comprising a substantially hollow housing provided with a forwardly presented opening surrounded by a diametrally enlarged radially extending planar flange, said flange in turn being provided at spaced intervals around its periphery with radially projecting ears which are of substantially the same thickness as the flange and are coplanar therewith, an annular bezel having an external diametral size substantially larger than the diametral distance between the outermost peripheral margins of the ears, said bezel including a cylindrical collar-like portion, the inside diameter of which is slightly larger than the outside diametral size of the annular flange of the housing so as to fit snugly but slidably around the periphery of said flange, said bezel being provided along its forward margin with an inwardly extending annular shoulder framing a relatively large viewing opening formed within the bezel, said shoulder having a rearwardly presented flat planar surface adapted for presentation abuttingly toward the outwardly presented face of the flange on the housing, the collarlike-portion of the bezel being further provided adjacent its rearward margin with a planar annular groove of substantially the same axial width as the thickness of the ears, said collar also being provided with spline-like axially extending recesses of slightly greater arcuate width than the ears and located around the collar-like portion in registering position with relation to the ears so that the ears may be slid into the recesses, said recesses being deeper in the axial direction than the axial distance between the groove and the rearwardly presented margin of the collar-like portion so that the ears can be pushed into the recesses past the groove, a transparent circular window-element having an outer diametral size approximately equal to the outside diametral size of the flange on the housing, a pair of resilient sealing rings disposed on opposite sides of the window-element, said sealing rings having an outside diametral size substantially similar to the outside diametral size of the window-element and being of relatively narrow radial width so as to abut respectively against the rearwardly presented face of the shoulder and the forwardly presented face of the flange without obscuring the window opening of the bezel or the forwardly presented opening of the housing, and a planar locking ring having a thickness substantially equal to the thickness of said groove, said locking ring having an internal diametral size slightly greater than the outside diametral size of the housing so as to fit snugly but nevertheless rotatably and slidably upon the housing so that it can be slid forwardly along the housing into abutment against the rear face of the flange thereof, said ring having an external diametral size slightly smaller than the internal diametral size of the collar on the bezel, said ring furthermore being provided with radially outwardly extending ears sized and positioned for slidable disposition within the recesses of the collar so as to be slid inwardly within the recesses into alignment with the groove and then rotated into engagement with the groove for locking the flange, the resilient rings and the window-like element into sealed position with the bezel, the combined uncompressed thickness of the two sealing rings, the window-element and the flange being greater than the axial distance between the planar surface and the groove of the bezel so that the housing and bezel are pressed axially together placing the sealing rings under compression when the ears of the locking ring are engaged in the groove, said bezel and said locking ring respectively having apertures for the reception of turning tools whereby the bezel and sealing ring can be rotated relative to each other to bring the ears of the locking ring into engagement within portions of the groove between the recesses.

References Cited in the file of this patent

UNITED STATES PATENTS

| | | |
|---|---|---|
| 771,094 | Rhoads | Sept. 27, 1904 |
| 1,830,973 | Wheaton | Nov. 10, 1931 |
| 2,402,360 | Bevins | June 18, 1946 |
| 2,698,721 | Van Otteren | Jan. 4, 1955 |
| 2,814,720 | Martin | Nov. 26, 1957 |
| 2,917,924 | Messick | Dec. 22, 1959 |